United States Patent [19]
Shawhan

[11] 3,930,220
[45] Dec. 30, 1975

[54] BOREHOLE SIGNALLING BY ACOUSTIC ENERGY

[75] Inventor: Elbert N. Shawhan, West Chester, Pa.

[73] Assignee: Sun Oil Company of Pennsylvania, Philadelphia, Pa.

[22] Filed: Sept. 12, 1973

[21] Appl. No.: 396,635

[52] U.S. Cl.... 340/18 FM; 340/18 CM; 340/18 NC; 325/9; 175/50; 73/DIG. 6
[51] Int. Cl.² .......................................... G01V 1/40
[58] Field of Search ..... 340/18 NC, 18 FM, 18 CM; 181/15 TS; 175/50; 325/1, 9; 73/151, 152, DIG. 6; 250/263

[56] References Cited
UNITED STATES PATENTS

| | | | |
|---|---|---|---|
| 2,017,126 | 10/1935 | Kroger | 250/263 |
| 3,205,477 | 9/1965 | Kalbfell | 340/18 FM |
| 3,593,139 | 6/1971 | Hershberg | 325/9 |
| 3,793,632 | 2/1974 | Still | 340/18 NC |

Primary Examiner—Maynard R. Wilbur
Assistant Examiner—N. Moskowitz
Attorney, Agent, or Firm—George L. Church; Donald R. Johnson; Macka L. Murrah

[57] ABSTRACT

A system for signaling in either direction in a borehole, utilizing an acoustic carrier transmitted along the drill pipe. The system employs repeaters which are spaced at uniform intervals along the string of pipe. To prevent undesired loss of signal information and interference between the signals being transmitted by the repeaters, the carrier frequency is shifted, during signal transmission, at time intervals related to the spacing between repeaters.

22 Claims, 5 Drawing Figures

BOREHOLE SIGNALLING BY ACOUSTIC ENERGY

This invention relates to the transmission of signals in boreholes, and particularly to the transmission of signals during the drilling of such holes. The value of a means for transmitting information from the bottom of a borehole to the surface has been recognized for some time, and proposed systems have been the subjects of numerous patents. The use of a continuous wire line for the transmission of signals is not desirable because this requires that the wire be withdrawn each time that a length of pipe is to be added; this is a costly interference with normal drilling procedures.

Various systems have been proposed for providing communication without wires, using pressure pulses in the drilling mud, acoustic signals through the mud, or electric signals utilizing conducting paths through the drill pipe and surrounding formation. However, because of excessive attenuation, large power requirements, high cost, slow speed of transmission, etc., these prior systems have not proven to be very practical.

In my copending application entitled "Telemetering System for Boreholes", Ser. No. 390,833, filed Aug. 23, 1973, 1973, over which the present invention may be considered to be an improvement, there is disclosed a telemetering system for boreholes utilizing an acoustic carrier transmitted along the drill pipe, the system employing repeaters positioned in the drill string. The system of the prior disclosure, however, is limited to only one direction of signal transmission, and also calls for repeaters of three different types (differing, at least, in their received and transmitted frequencies).

Ofter, it is desirable to be able to communicate in either direction, in a borehole; also, the installation of the repeaters in the drill string is made easier if all of the repeaters are identical.

An object of this invention is to provide an improved acousitc energy signaling system for boreholes.

Another object is to provide a borehole signaling system which can be used for communication in either direction.

A further object is to provide a borehole signaling system using repeaters, wherein the repeaters are all identical.

A still further object is to provide an improved acoustic signaling system, using repeaters, which prevents interference between the signals being transmitted by the repeaters.

A detailed description of the invention follows, taken in conjunction with the accompanying drawings, wherein.

The present application describes a method for transmitting acoustic signals in a continuous manner through the drill pipe in a borehole by inserting repeaters as necessary, at intervals such as to restore the energy level before it drops too low to be recovered from the noise background. It is known that the impedance mismatch between steel and the surrounding mud essentially prevents escape of acoustic energy into the mud. The principal loss of acoustic energy occurs at the screwed connections between pipe sections; this loss increases as the frequency is raised. At a carrier frequency of 1000 Hz, the loss has been measured as 30 db per thousand feet of pipe. For purposes of illustration, the present specification is based on a uniform repeater separation of 2000 feet, and carrier frequencies of 800 and 1000 Hz (why two carrier frequencies are mentioned here will later become apparent).

Each repeater in the system (1) restores the signal level lost due to attenuation in the pipe, and (2) improves the signal-to-noise ratio. All repeater units used in the system are identical, and are uniformly spaced in the drill string. The distance between the top repeater and the surface varies with the hole depth, but does not exceed the interrepeater spacing.

Figure 1:
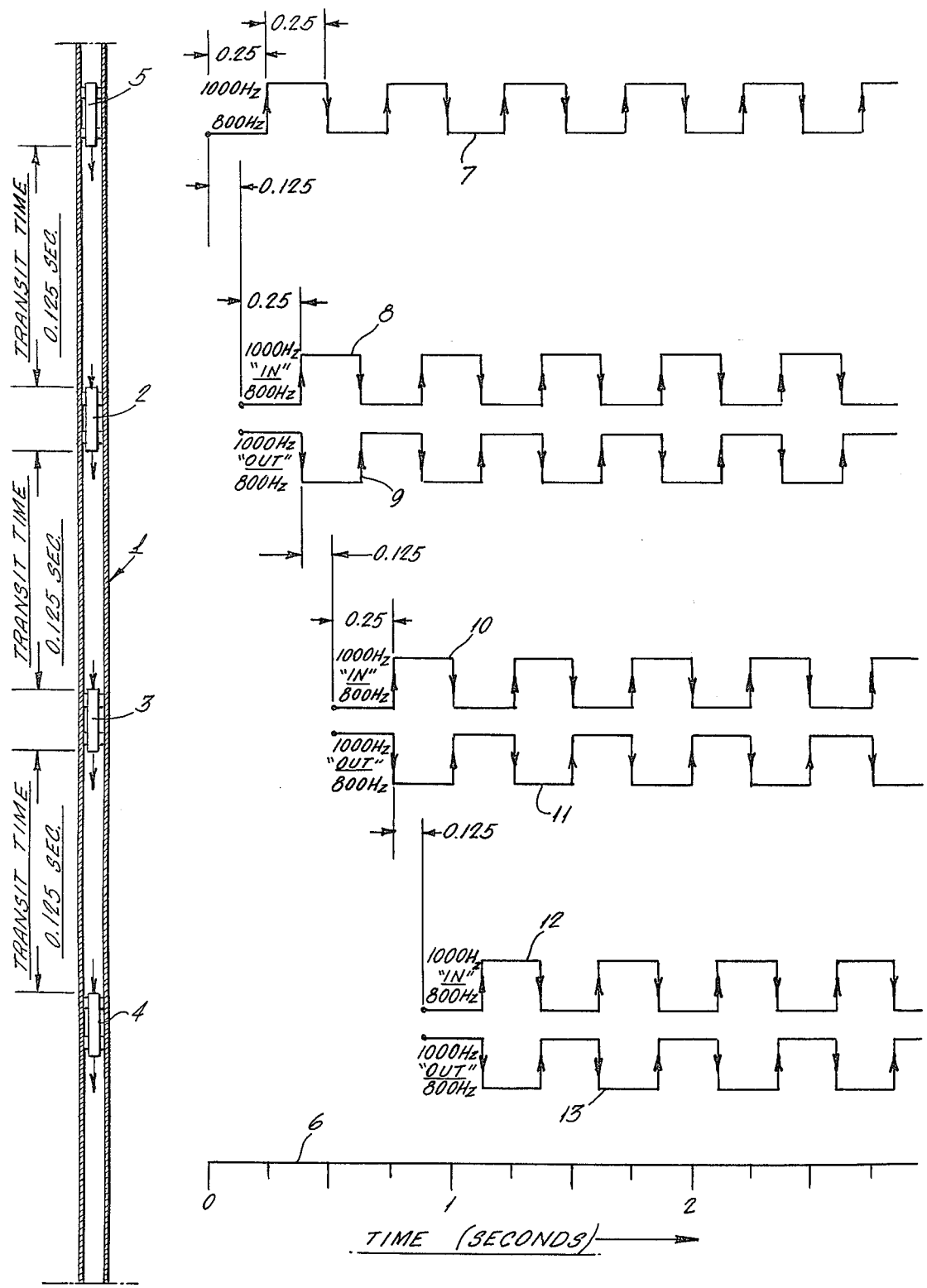
FIG. 1 is a schematic view of a drill pipe string, together with timing diagrams for illustrating the present invention during downward transmission.

Referring first to FIG. 1, the numeral 1 generally designates a drill pipe string which comprises a plurality of pipe sections (not separately delineated) coupled together end-to-end, in a conventional manner.

A series of repeaters 2, 3, and 4 (schematically illustrated) are installed in pipe string 1 at uniform intervals of 2000 feet, for example. The function of each repeater is, in general, to pick up (receive) an acoustic signal (signal-modulated carrier) from the string of drill pipe, amplify it, and retransmit it as an acoustic signal along the pipe. The repeaters 2–4 thus perform the same general or overall function as those disclosed in my above-mentioned copending application.

It should be apparent that no repeater can simultaneously transmit and receive on the same frequency without severe loss of signal information, due to mixing of the strong transmitted signal with the weaker incoming signal.

Moreover, if alternate units simultaneously transmit and receive on the same two frequencies, signals of the same level will be received from two sources. For example, if repeaters 2 and 4 receive on 800 Hz and transmit on 1000 Hz while repeater 3 receives on 1000 Hz and transmits on 800 Hz, repeater 3 will receive 1000 Hz signals of equal amplitude from repeaters 2 and 4 (since the acoustic energy is of course transmitted as compressional waves in both directions along the pipe). Because of the time displacement (signals traveling from repeater 4, through repeater 3, through repeater 2, and back to repeater 3, as compared to signals traveling only from repeater 4 to repeater 3), there will be random cancellation, and the modulating information will be lost.

In the system illustrated in FIG. 1, two frequencies (e.g., 800 Hz and 1000 Hz) are used as acoustic (sonic) carrier frequencies, these frequencies being alternated at time intervals such that each repeater receives only one signal. This signal comes from the direction of the command signal generator 5, illustrated schematically at the upper end of the drill string 1 in FIG. 1.

The velocity of sound in steel for the longitudinal mode is 16,000 feet per second, so the transit time between the repeaters shown in FIG. 1 is 0.125 second (assuming a uniform repeater separation of 2000 feet).

First, the overall operation of the FIG. 1 system will be explained; details of the circuitry for bringing about such operation will be described later. In FIG. 1, sets of timing diagrams (frequency-vs.-time graphs), referred to the horizontal time axis 6 at the bottom of this figure, are positioned respectively in alignment with the items (2,3,4, or 5) to which they respectively apply.

In the absence of a command signal, all repeaters receive at 800 Hz, and their transmitters are turned off. To begin a turn-on sequence (to thereby establish a communication channel), an acoustic carrier of 800 Hz is transmitted from the command signal generator 5; assume this begins at time zero, as indicated by the timing diagram 7. Thereafter, at a time of 0.25 second (equal to twice the transit time between repeaters), the command carrier frequency (transmitted from generator 5) shifts to 1000 Hz; then, after another interval of 0.25 second, back to 800 Hz, and so on, so that the carrier frequency transmitted from command signal generator 5 may be said to alternate back and forth between 800 Hz and 1000 Hz, at time intervals of 0.25 second.

Repeater 2 begins to receive the carrier not more than 0.125 second (the acoustic transit time for 2000 feet of pipe) after the command carrier begins its 800 Hz transmission, as indicated by the "IN" or received timing diagram 8; the "OUT" or transmitted carrier follows changes in command carrier frequency thereafter, as indicated by the timing diagram 9. It is pointed out that both the "IN" and "OUT" carrier frequencies 8 and 9 of repeater 2 follow changes in the command carrier frequency 7, beginning with receipt of the 800 Hz carrier (from command generator 5) at time 0.125.

Repeater 3 is actuated 0.125 second after repeater 2 begins transmission on 800 Hz (at time 0.375; see graph 9), or not more than 0.5 second after start of the command signal (at time zero). Thereafter, the "IN" and "OUT" carriers of repeater 3 follow the changes in command carrier frequency, as indicated by graphs 10 and 11, respectively.

Likewise, repeater 4 is actuated (i.e., begins to transmit the signal) 0.125 second after repeater 3 begins transmission on 800 Hz (at time 0.75; see graph 11), or not more than 0.875 second after start of the command signal. Thereafter, the "IN" and "OUT" carriers of repeater 4 follow the changes in command carrier frequency, as indicated by graphs 12 and 13, respectively.

The maximum time required to establish a communication channel through 20,000 feet of pipe (it being remembered that 6000 feet of pipe are involved between command generator 5 and repeater 4) would be 2.75 seconds. However, after the initial turn-on sequence, the time required to transmit a signal, as modulation on the acoustic carrier, is limited only by the velocity of sound, and would be 1.25 seconds per 20,000 feet of pipe.

The purpose of shifting the carrier frequency (with time, in a continued manner, once communication has been established) is to prevent interference from the transmission of the next repeater in the sequence. The transit time displaces the carrier received from the following repeater relative to the carrier traveling in the desired direction. From FIG. 1 (left-hand portion), it may be seen that either carrier frequency emitted by repeater 3 requires 0.125 second to reach repeater 2 (transit time between 2 and 3 is 0.125 second); the input of repeater 2 (graph 8) is at that time always tuned to the alternate frequency (compare graph 11 with graph 8). Likewise, repeater 3 cannot receive the carrier transmitted by repeater 4 (compare graph 13 with graph 10, the transit time between repeaters 3 and 4 also being 0.125 second). Moreover, the output of repeater 4 (graph 13) requires 0.25 second (twice the adjacent-repeater transit time of 0.125 second) to reach the input of repeater 2, and always arrives when the input filter of repeater 2 (see graph 8) is tuned to the other frequency.

The direction of transmission can be reversed by turning on the command signal at the desired initiating end of the drill string, and turning off the command signal at the other end. Information may be transmitted as soon as the required frequency turn-on sequence (such as previously described, in connection with FIG. 1) has been established.

Figure 2:
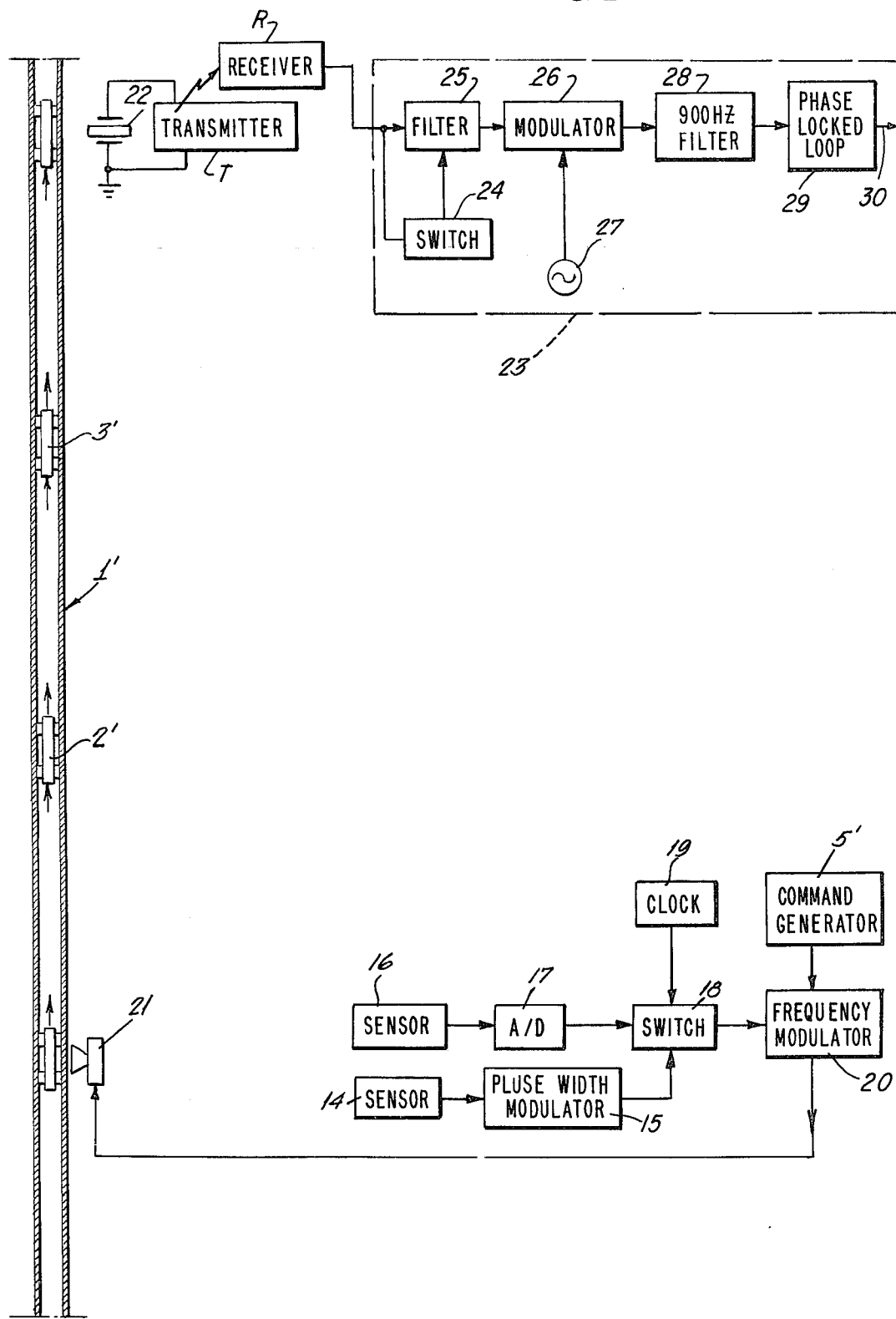
FIG. 2 is a schematic illustration of a borehole telemetry system, utilizing the principles of the present invention for upward transmission.

One form of a borehole information transmission system (borehole telemetry system) is illustrated in block diagram form in FIG. 2. A sensor 14 for measuring information downhole develops a signal which is converted to pulse width coding by means of a pulse width modulator unit 15. An example of such a sensor (responsive to inclination of a drilling element) developing pulse width modulation is described in my copending application, Ser. No. 396,627, filed Sept. 12, 1973, entitled "High Side Meter". Another sensor 16 responsive to downhole information may develop analog potentials or currents which are converted to digital coding by means of an analog-to-digital converter 17. Any number of coded signals are selected in sequence by a multiplex switch 18 controlled by a clock unit 19.

The command signal generator 5', which is similar to the command generator 5 in FIG. 1, produces a carrier which alternates between 800 and 1000 Hz, as previously described in connection with FIG. 1 (time-frequency graph 7). This carrier is fed to a frequency modulator 20, as is the signal from the multiplexer 18. As the command signal alternates the carrier between 800 and 1000 Hz, the coded signal (from 18) introduces an additional smaller shift in frequency (maximum shift 50 Hz). The frequency shift keyed (FSK) output of modulator 20 is applied to a sound source 21, for conversion into acoustic energy, which is transmitted as compressional waves toward the surface along drill string 1'. The sound source 21 is preferably of the construction disclosed in my "Telemetering System for Boreholes" application. An "off" position could be included in the switching sequence of multiplex switch 18, to turn "off" the command signal from 5', thus to permit command instructions to be transmitted from the surface.

Repeaters 2' and 3', similar to the repeaters 2–4 of FIG. 1, are utilized between the downhole sound source 21 and the surface, to compensate for attenuation in the pipe and to improve the signal-noise ratio.

At the surface, the acoustic signal traveling along the drill pipe is picked up by a signal pickup or receiver 22 (illustrated as a piezoelectric crystal) which is acoustically coupled to the drill string. The receiver 22 is preferably a crystal-type receiver, as described in my "Telemetering System for Boreholes" application. The signal received at the surface is transmitted by means of a radio link involving a transmitter T and a receiver R to the demodulating unit 23. In this unit, the received signal is fed to a frequency-controlled switch 24 (to be later described in more detail) which controls the center frequency of an active filter 25 to which the received signal is also fed. The filter 25 is controlled (by switch 24) to make its center frequency either 800 Hz or 1000 Hz, depending upon the frequency of the incoming signal.

The output of the filter 25 is fed to a balanced modulator 26, to which is also applied (for mixing with the 800 Hz or 1000 Hz output of filter 25) a 100 Hz wave from a local oscillator 27. The balanced modulator then acts to produce, at its output, sidebands of 700 and 900 Hz (when the received carrier is 800 Hz) or sidebands of 1100 and 900 Hz (when the received carrier is 1000 Hz).

The output of the modulator 26 is fed to the input of a 900 Hz filter 28, which passes in each case the 900 Hz sideband to the phase-locked loop 29 (later described in more detail), the control voltage output of which, at 30, provides a reproduction of the modulation (digital or pulse width modulation) being transmitted from downhole in FIG. 2.

Summarizing the foregoing, in the demodulating unit 23 the periodic shift in carrier frequency is eliminated (the output of filter 28 being 900 Hz, regardless of whether the incoming carrier is centered at 800 Hz or at 1000 Hz), and the smaller frequency shifts are converted to coded signals which duplicate the downhole modulating signals.

Details of the system for transmitting instructions from the surface (which is the system arrangement depicted, for illustrative purposes, in FIG. 1) are not shown in FIG. 2; however, the general form of such should be apparent from the previous description. The apparatus at the surface would have to include a carrier command module, generally similar to unit 5' previously described, with the coded instructions, and a sound source (similar to sound source 21) in contact with the pipe. The downhole apparatus would then have to include a sound pickup (like pickup 22) and a duplicate of the surface demodulating unit 23.

At this juncture, it should be noted that no interference will be caused by the varying distance of the top repeater (repeater 2 in FIG. 1, or repeater 3' in FIG. 2) below the surface. In this connection, it will be recalled that this invention is based on a uniform spacing (say 2000 feet) between repeaters, but the uppermost repeater may or may not be this particular distance below the surface. The uniform spacing between repeaters determines the interval between shifts in the carrier frequency. This interval is twice the acoustic transit time between repeaters (i.e., twice the repeater spacing, divided by the acoustic velocity in the pipe), to avoid interference due to two signals of the same frequency reaching a repeater input at the same time. However, the surface unit does not transmit in response to a received signal. It only demodulates the received signal (as in FIG. 2), or else sends a command signal when the repeater transmitters are to be turned on in sequence (as in FIG. 1). Reduced spacing between the top repeater and the surface (in FIG. 1) merely reduces the turn-on time.

Figure 3:
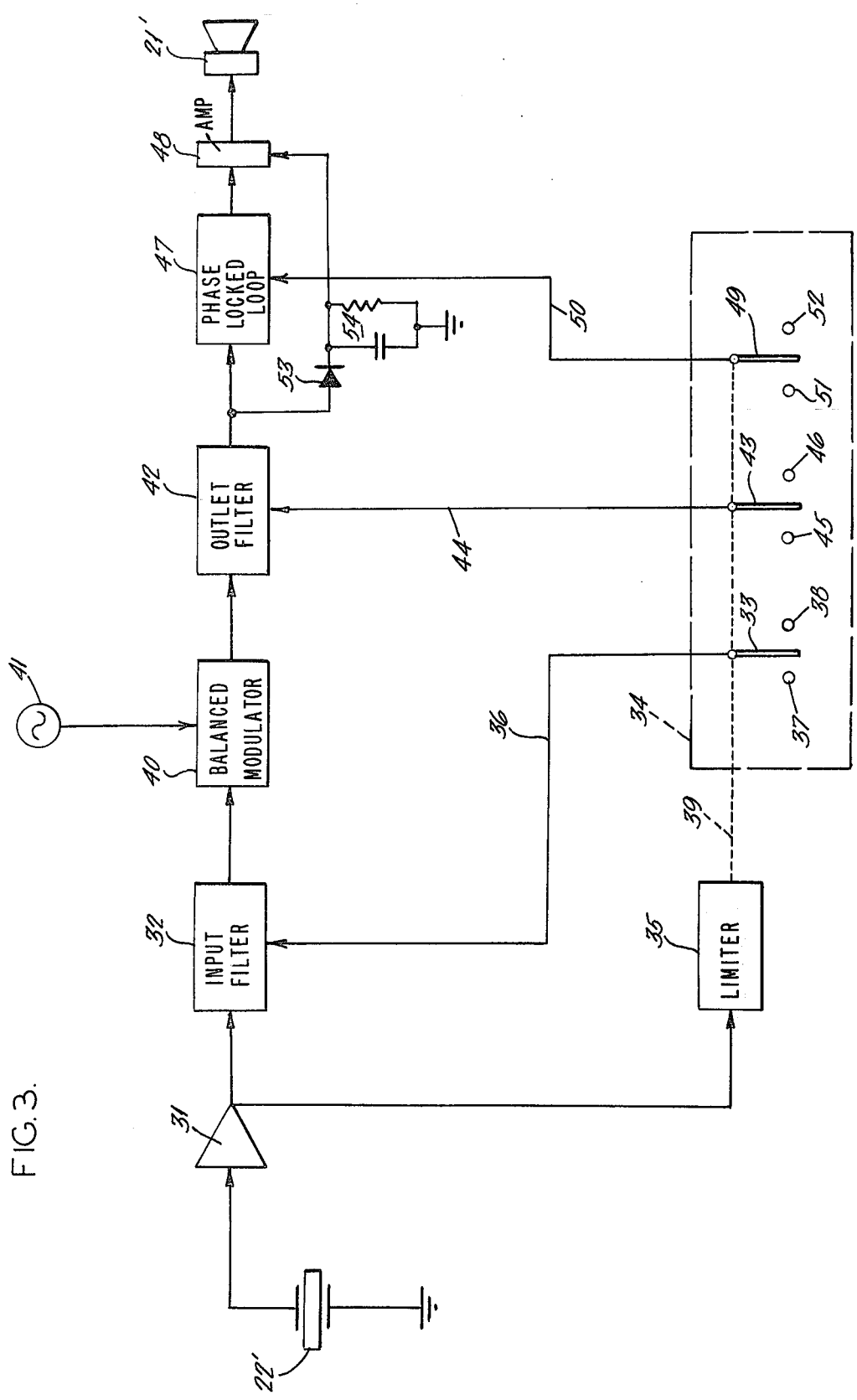
FIG. 3 is a block diagram of a repeater used in the invention.
Figure 4:
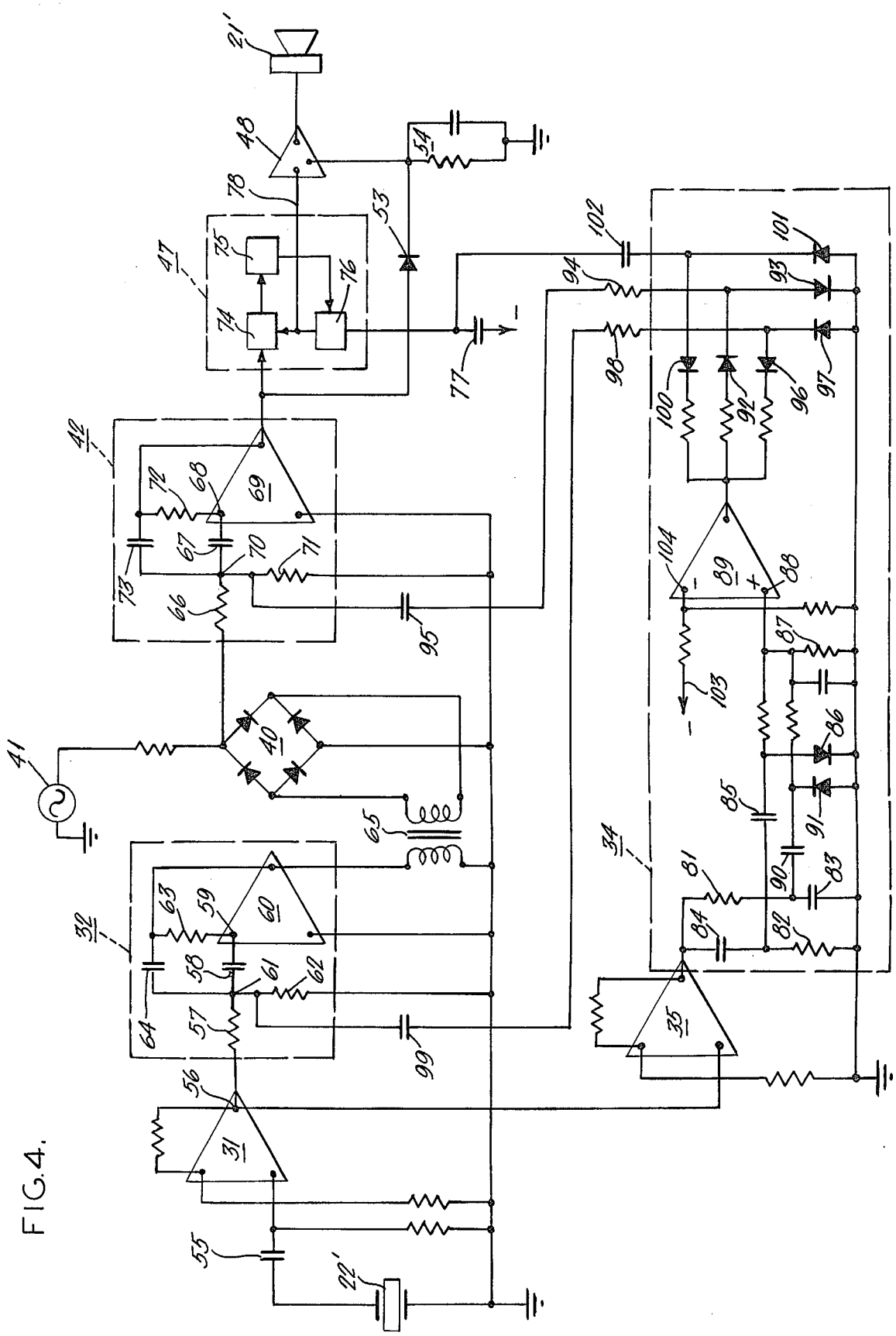
FIG. 4 is a detailed circuit diagram of the repeater of FIG. 3.

FIGS. 3 and 4 provide additional details of the arrangement at one of the repeaters (2, 3, or 4 in FIG. 1, or 2', 3' in FIG. 2), FIG. 3 being an illustration in block diagram form and FIG. 4 showing the essential circuit details.

Refer first to FIG. 3. The acoustic signal picked up from the drill string by the acoustic pickup 22' (which may be of the same type as pickup 22, previously referred to in connection with FIG. 2) is fed through a preamplifier 31 to the input side of an input filter 32, which is an active filter of a type whose center frequency can be shifted by changing one resistor value. In FIG. 3, this shiftable center frequency is represented as effected by one arm or pole 33 of a frequency-actuated switch 34 to which is supplied the received signal (output of preamplifier 31) by way of a limiter 35. The arm 33 is coupled by way of a lead 36 to filter 32, for controlling the center frequency of the latter. The arm 33 has an "800 Hz" contact position 37 and a "1000 Hz" contact position 38, as well as an intermediate position (illustrated) which it assumes in the absence of an input signal. The frequency-actuated switch 34 is actuated (as indicated by the dotted line 39) in accordance with the frequency of the output of limiter 35. The active filter 32 has a roll-off of 40 db for 100 Hz.

In the absence of an input signal, the input filter 32 is tuned to 800 Hz. The output of filter 32 is connected as one input for a balanced modulator 40, the second input for which is supplied by a local oscillator 41 operating at 200 Hz. The output of modulator 40 is fed to the input side of an output filter 42, which is similar to the input filter 32. In the case of filter 42, the shiftable center frequency is represented as effected by a second arm or pole 43 of the frequency-actuated switch 34. Arm 43 is coupled by way of a lead 44 to filter 42, for controlling the center frequency of the latter. The arm 43 has a "1000 Hz" contact position 45 (analogous to the "800 Hz" position 37 of arm 33) and an "800 Hz" contact position 46 (analogous to the "1000 Hz" position 38 of arm 33), as well as a no-signal intermediate position. in the absence of an input signal, the output filter 42 is tuned to 1000 Hz.

The output of filter 42 is fed to a phase-locked loop 47, whose output is applied through a power amplifier 48 to a sound source 21', similar to sound source 21 (previously mentioned). In the absence of an input signal, the sound source 21' is turned off, by means of a squelch voltage provided in power amplifier 48 (which otherwise drives the sound source 21').

The center of the capture range of the phase-locked loop is varied by changing a capacitance value. This variable capture frequency is represented as effected by a third arm or pole 49 of the frequency-actuated switch 34. Arm 49 is coupled by way of a lead 50 to the phase-locked loop 47, for controlling the capture frequency of the latter. The arm 49 has a "1000 Hz" contact position 51 (analogous to the "1000 Hz" position 45 of arm 43) and an "800 Hz" contact position 52 (analogous to the "800 Hz" position 46 of arm 43), as well as a no-signal intermediate position.

The arms 33, 43, and 49 of switch 34 all are operated together (as indicated by the dotted-line coupling 39), in the manner of a three-pole, double-throw switch; thus, the arm 33 moves to its "1000 Hz" contact 38 along with the movement of arm 43 to its "800 Hz" contact 46 and with the movement of arm 49 to its "800 Hz" contact 52; likewise, the arm 33 moves to its "800 Hz" contact 37 along with the movement of arm 43 to its "1000 Hz" contact 45 and with the movement of arm 49 to its "1000 Hz" contact 51.

As previously stated, in the absence of an input signal, the input filter 32 is tuned to 800 Hz (i.e., its center frequency is 800 Hz). When an acoustic signal of 800 Hz is received at pickup 22', this signal passes through filter 32, developing sidebands of 600 Hz and 1000 Hz in the balanced modulator 40. As previously stated, the output filter 42 is then tuned to 1000 Hz, so the 1000 Hz sideband is passed by filter 42, is rectified by a rectifier 53, developing a voltage across the RC network 54 which overrides the squelch (in 48), activating the sound source 21', which then transmits the 1000 Hz frequency (fed to such source by way of loop 47 and amplifier 48). The phase-locked loop 47 follows the most persistent frequency within its capture range, and gives substantial reduction of random noise.

When the incoming carrier shifts to 1000 Hz, the frequency-actuated switch 34 (receiving the incoming signal through preamplifier 31 and limiter 35), in effect, moves the arms 33, 43, and 49 to their right-hand contacts 38, 46, and 52, respectively. Arm 33, on contact 38, changes the center frequency of input filter 32 to 1000 Hz. The 1000 Hz signal then passes through filter 32, developing sidebands of 800 and 1200 Hz in the balanced modulator 40.

Arm 43, on contact 46, changes the center frequency of output filter 42 to 800 Hz, and arm 49, on contact 52, changes the center of the phase-locked loop 47 capture range to 800 Hz. Filter 42 then passes the 800 Hz sideband from modulator 40, and the 800 Hz frequency is transmitted from sound source 21', in amplified form.

When the incoming carrier shifts back to 800 Hz, the frequency-actuated switch 34 (receiving the incoming signal through preamplifier 31 and limiter 35), in effect, moves the arms 33, 43, and 49 to their left-hand contacts 37, 45, and 51, respectively. Arm 33, on contact 37, changes the center frequency of input filter 32 to 800 Hz. The 800 Hz signal then passes through filter 32 developing sidebands of 600 and 1000 Hz in the balanced modulator 40.

Arm 43, on contact 45, changes the center frequency of output filter 42 to 1000 Hz, and arm 49, on contact 51, changes the center of the phase-locked loop 47 capture range to 1000 Hz. Filter 42 then passes the 1000 Hz sideband from modulator 40, and the 1000 Hz frequency is transmitted from sound source 21', in amplified form.

Now refer to FIG. 4, which is a detailed circuit diagram of a repeater used in the system of this invention. The wave (acoustic or sonic frequency carrier of 800 Hz or 1000 Hz, frequency modulated by a signal) picked up by the pickup or receiver 22' is fed through a coupling condenser 55 to the input of the preamplifier 31, which is an operational amplifier connected in a conventional manner, as illustrated. From the output 56 of preamplifier 31, the amplified voltage is fed over a resistor 57 and a capacitor 58 (both included in the input active filter 32) to one input 59 of an operational amplifier 60, which forms the "active" part of the active filter 32. From the common junction point 61 of elements 57 and 58, a resistor 62 is connected to the reference potential point (ground). A resistor 63 and a capacitor 64 are connected in series between amplifier input 59 and junction point 61.

It may be noted that all of items 57 through 64 are included in the input active filter 32. For filters of this type, the center frequency $F_0$ is given by $$F_0 = \frac{1}{2\pi \left(\frac{2}{\Delta} - A\Delta\right) R_1 C_1} \quad (1)$$

where $\Delta$ is the bandwith, $A$ is the voltage gain, $R_1$ is the resistance of resistor 62, and $C_1$ is the capacitance of capacitors 58 or 64. From Equation (1) above, it may be seen that the addition of resistance in parallel with $R_1$ (resistor 62) raises the center frequency.

Output from the input active filter 32 is supplied by means of a transformer 65 to one pair of input terminals of the balanced modulator 40, and the local oscillator 41 (frequency, 200 Hz) is connected to the other pair of input terminals of modulator 40.

The output of the modulator 40 (600 Hz and 1000 Hz, when the input at 65 is 800 Hz; 800 Hz and 1200 Hz, when the input at 65 is 1000 Hz) is fed over a resistor 66 and a capacitor 67 to one input 68 of the operational amplifier 69 (similar to amplifier 60) of the output active filter 42. From the common junction point 70 of elements 66 and 67, a resistor 71 is connected to ground. A resistor 72 and a capacitor 73 are connected in series between amplifier input 68 and junction point 70.

Included in the phase-locked loop 47 are a phase discriminator 74, a low-pass filter 75, and a voltage-controlled oscillator 76. Output from the output active filter 42 (1000 Hz or 800 Hz) provides one input for the phase discriminator 74, output from the voltage-controlled oscillator 76 providing the other input for the phase discriminator. The phase discriminator output, representative of frequency and/or phase differences between the filter output and the oscillator output, is passed through the low-pass filter 75 and then applied to the voltage-controlled oscillator 76 to phase-lock the latter with the output of filter 42. A capacitor 77, coupled to the voltage-controlled oscillator 76, determines the center of the phase-locked loop capture range; this range is centered at 1000 Hz if capacitor 77 alone is in the circuit.

By means of a coupling 78, output is taken from the voltage-controlled (phase-locked) oscillator 76, and applied through the power amplifier 48 (if the latter is unsquelched) to the sound source (sound transmitter) 21'. If a signal is present at the output of filter 42, it is rectified at 53 to develop a voltage across the network 54 which overrides the squelch in amplifier 48, turning on the sound source 21'.

At this juncture, it should be mentioned that it is intended that the system of this invention be able to communicate in either direction, along the drillpipe. The direction depends on the location of the command signal source. If the command signal originates downhole (as in FIG. 2), it sets up the time sequence of filter frequencies to permit transmission toward the surface. If the command signal originates at the surface (as in FIG. 1), the time sequence is set up (as described in connection with FIG. 1) to send control signals downhole. The command is downhole (signals toward the surface) unless pre-empted by an overriding command signal at the surface, introduced when the sound sources 21,21', etc. are turned off (in response to the cessation of a command signal from downhole).

Operation of the frequency-actuated switch 34 depends upon the frequency discriminator formed by two resistors 81 and 82 and two capacitors 83 and 84. Capacitor 84 and resistor 82 are connected in series across the output of limiter 35, and resistor 81 and capacitor 83 are also connected in series across the limiter output. The voltage across resistor 82 is taken off by way of a capacitor 85 and is rectified in a negative sense by diode 86 to provide a voltage across load resistor 87 which is applied to the direct input 88 of an operational amplifier 89. The voltage across capacitor 83 is taken off by way of a capacitor 90 and is rectified in a positive sense by diode 91 to also provide a voltage across the combining load resistor 87.

The values of components 81–84 are chosen so that, at 900 Hz, the impedance of resistor 82 is equal to the impedance of capacitor 84, and the impedance of resistor 81 is equal to the impedance of capacitor 83. As a result, at 800 Hz the impedance of resistor 82 is less than that of capacitor 84, while the impedance of capacitor 83 is greater than that of resistor 81. Therefore, at 800 Hz the voltage across capacitor 83 is greater than the voltage across resistor 82, so the net rectified voltage on the direct input of amplifier 89 is positive and the amplifier output is positive. Likewise, at 1000 Hz the impedances of capacitors 84 and 83 are less than those of resistors 82 and 81, the net rectified voltage on the direct amplifier input is negative, and the amplifier output voltage is negative.

A pair of diodes 92 and 93 are poled as illustrated and connected in series aiding, between the output of amplifier 89 and ground, and from the common junction of these two diodes a resistor 94 is coupled through a capacitor 95 to the ungrounded end of resistor 71 (in the output active filter 42.) When the incoming frequency (received at the repeater diagrammed in FIG. 4) is 800 Hz, the output voltage of amplifier 89 is positive and diodes 92 and 93 conduct, connecting resistor 94 in parallel with resistor 71 of the output filter 42, through capacitor 95. With resistor 62 (in input filter 32) and resistor 71 (in output filter 42) in the circuit, both filters 32 and 42 have a center frequency of 800 Hz. Resistor 94 is chosen to tune the output filter 42 to 1000 Hz when connected in parallel with resistor 71; this occurs, as stated, when the incoming frequency is 800 Hz.

A pair of diodes 96 and 97, poled as illustrated, are connected in series aiding between the output of amplifier 89 and ground, and from the common junction of these two diodes a resistor 98 is coupled through a capacitor 99 to the ungrounded end of resistor 62 (in the input active filter 32). When the incoming carrier frequency shifts to 1000 Hz, the output of amplifier 89 is negative and diodes 96 and 97 conduct, connecting resistor 98 in parallel with resistor 62 of the input filter 32, through capacitor 99. Resistor 98 tunes the input filter 32 to 1000 Hz when connected in parallel with resistor 62. Since resistor 94 is now no longer connected into the circuit, the output filter 42 returns to 800 Hz center frequency.

A pair of diodes 100 and 101, poled as illustrated (similarly to diodes 96 and 97), are connected in series aiding between the output of amplifier 89 and ground, and from the common junction of these two diodes a capacitor 102 is connected to the "high" side of capacitor 77 (which latter is in circuit with the voltage-controlled oscillator 76), and thus essentially in parallel with capacitor 77 (when capacitor 102 is connected to ground by way of diode 101). When the incoming carrier frequency shifts to 1000 Hz, the output of amplifier 89 is negative and diodes 100 and 101 conduct, connecting capacitor 102 in parallel with capacitor 77. Thus, at this time capacitor 102 is added to capacitor 77, to lower the center of the capture range of the phase-locked loop 47 to 800 Hz.

As indicated by the coupling 103 to a negative potential source, a small negative bias is applied to the inverting input 104 of amplifier 89. This causes the amplifier output to be positive during standby (i.e., in the absence of an input signal). When the amplifier output is positive, there is no resistance connected in parallel with resistor 62 (in the input filter 32), so the center frequency of the input filter 32 is then 800 Hz. When the amplifier output is positive, resistor 94 is connected in parallel with resistor 71, so the center frequency of the output filter 42 is then 1000 Hz. The negative output of the discriminator 81–84 (when the incoming carrier is 1000 Hz) is sufficient to override this bias (on inverting input 104).

FIG. 2 illustrates, in block diagram form, a demodulating unit 23 connected to a sound pickup 22 at the surface through a radio link T-R. The circuitry of the demodulating unit is shown in more detail in FIG. 5. This circuit performs three functions: (1) it discriminates between the frequency modulated signal and amplitude modulated noise; (2) the periodic shift in carrier frequency is eliminated, and the carrier is restored to a single frequency; (3) the coded signals used to modulate the carrier are recovered in the original form.

Figure 5:
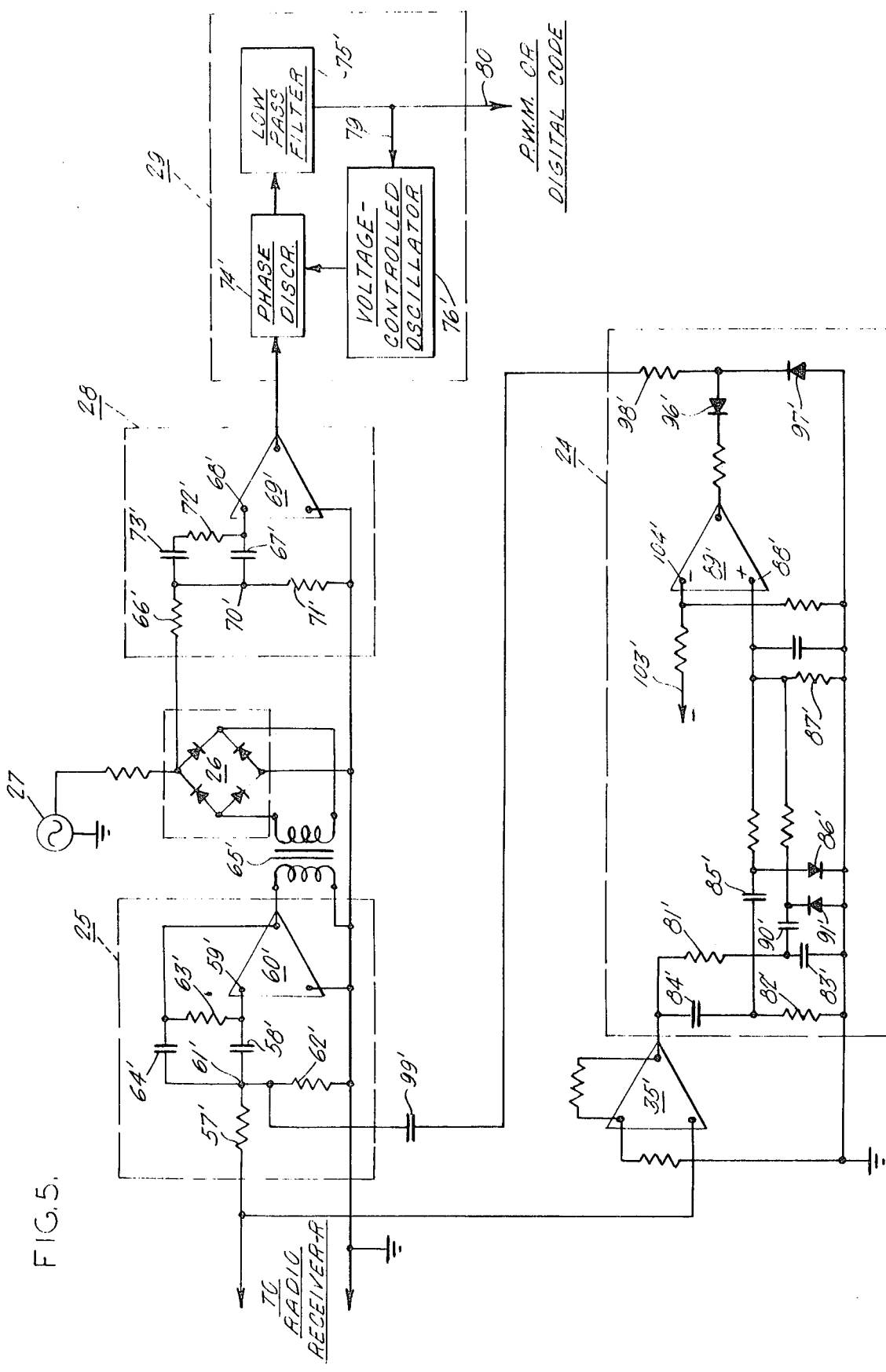
FIG. 5 is a detailed circuit diagram of a demodulating unit used in the invention.

In FIG. 5, elements similar to those previously described are denoted by the same reference numerals, but carrying prime designations. In the demodulating unit, the incoming signal is first passed through an input active filter 25 which is tuned to either 800 or 1000 Hz by the frequency-actuated switch 24 as the carrier shifts. The incoming signal is supplied to the switch 24, for actuation thereof, by way of the limiter 35'; the switch 24 is constructed somewhat similarly to, and operates like, the switch 34 (in FIG. 4, previously described), but for control of the center frequency of the input filter 25, only.

The balanced modulator 26 receives inputs from the local oscillator 27 (100 Hz) and from the input filter 25. Modulator 26, supplied by oscillator 27 with a frequency equal to half the difference between the two carrier frequencies, generates sidebands of 700 and 900 Hz at the lower incoming carrier frequency (800 Hz), and of 900 and 1100 Hz at the higher incoming carrier frequency (1000 Hz); both of these incoming carrier frequencies, of course, refer to the modulator input from filter 25. The sideband of 900 Hz is common to both of the above-mentioned pairs of sidebands, and is selected by the output active filter 28 which receives the modulator output. The output filter 28 is rather similar in construction to the output filter 42 previously described, but the former is fixed-tuned to a center frequency of 900 Hz.

The phase-locked loop 29, which receives the output of filter 28, is rather similar in construction to the phase-locked loop 47 previously described, but the center of the capture range of the former is fixed at 900 Hz.

The phase-locked loop 29 generates a d.c. control voltage (output of phase discriminator 74', passed through low pass filter 75') which adjusts (at 79) the voltage-controlled oscillator 76' to keep its frequency equal to that of the incoming signal (output of filter 28). This control voltage must follow the frequency shifts due to the modulation downhole. Hence, it provides (at 80) a reproduction of the digital or pulse-width signal being transmitted from downhole (see FIG. 2).

The invention claimed is:
1. In a signal transmission system utilizing a continuous carrier which is periodically shifted back and forth between two frequencies $f_1$ and $f_2$: a repeater arrangement for receiving and retransmitting said carrier com- prising a signal receiver, a tunable input circuit receptive of the signal receiver output, a tunable output circuit, a signal transmitter coupled to and driven from said output circuit, and means, acting in response to the receipt by said receiver of carrier frequency $f_1$, to tune said input circuit to frequency $f_1$ and to tune said output circuit to frequency $f_2$.

2. Repeater according to claim 1, wherein said means also acts, in response to the receipt by said receiver of carrier frequency $f_2$, to tune said input circuit to frequency $f_2$ and to tune said output circuit to frequency $f_1$.

3. A signal transmission system for use in a borehole, comprising, at a location A: a sound source acoustically coupled to the drill pipe in said borehole for transmitting an acoustic carrier wave along such pipe, and means supplying to said source wave energy periodically shifted back and forth between two frequencies $f_1$ and $f_2$, thereby to transmit along the drill pipe an acoustic carrier wave periodically shifted back and forth between frequencies $f_1$ and $f_2$; and at a location B spaced a pre-established distance along said drill pipe from location A: a sound pickup acoustically coupled to the drill pipe, a tunable input circuit receptive of the sound pickup output, and means acting upon the receipt by said pickup of carrier frequency $f_1$ to tune said input circuit to frequency $f_1$.

4. System set forth in claim 3, wherein said means at location B also acts, upon the receipt by said pickup of carrier frequency $f_2$, to tune said input circuit to frequency $f_2$.

5. System according to claim 3, wherein the distance between location A and location B is known, and wherein the frequency shifts of the transmitted carrier wave are separated by time intervals equal to twice the acoustic transit time, in the drill pipe, for such known distance.

6. System of claim 3, including also, at location B, a tunable output circuit associated with said input circuit, and a sound transmitter acoustically coupled to the drill pipe and driven from said output circuit; said means at location B acting also, upon the receipt by said pickup of carrier frequency $f_1$, to tune said output circuit to frequency $f_2$.

7. System set forth in claim 6, wherein said means at location B also acts, upon the receipt by said pickup of carrier frequency $f_2$, to tune said output circuit to frequency $f_1$.

8. System set forth in claim 7, wherein the distance between location A and location B is known, and wherein the frequency shifts of the transmitted carrier wave are separated by time intervals equal to twice the acoustic transit time, in the drill pipe, for such known distance.

9. A signal transmission system for boreholes, comprising a command signal generator located at one end of a string of drill pipe, and a plurality of identical repeaters in said pipe string spaced from said generator and from each other, said repeaters being spaced at known, uniform distances from each other along the length of said string; said command signal generator including means for transmitting along said string a continuous acoustic carrier which is periodically shifted back and forth between two frequencies $f_1$ and $f_2$; each of said repeaters including a sound pickup acoustically coupled to the drill pipe, a tunable input circuit receptive of its respective sound pickup output, a tunable output circuit, a sound transmitter acoustically coupled to the drill pipe and driven from its respective output circuit, and means acting upon the receipt by each pickup of carrier frequency $f_1$ to tune its respective input circuit to frequency $f_1$ and to tune its respective output circuit to frequency $f_1$.

10. System according to claim 9, wherein the means in each repeater also acts, upon the receipt by its pickup of carrier frequency $f_2$, to tune its respective input circuit to frequency $f_2$ and to tune its respective output circuit to frequency $f_1$.

11. System according to claim 9, wherein the frequency shifts of the carrier transmitted by said command signal generator are separated by time intervals equal to the quotient: twice the inter-repeater spacing, divided by the acoustic velocity in the drill pipe.

12. System according to claim 9, wherein each of the repeater input circuits is an active filter, and each of the repeater output circuits is an active filter.

13. System of claim 9, wherein each of said repeaters also includes a shift frequency heterodyne oscillator connected to heterodyne with the output of the respective input circuit to provide a sideband frequency for application to the respective output circuit, the frequency of the oscillator in each repeater being equal to the difference between $f_1$ and $f_2$.

14. System according to claim 9, wherein each of the repeater input circuits is an active filter whose center frequency depends on the value of an impedance coupled thereto, and wherein the means in each repeater changes the effective value of the corresponding input active filter impedance.

15. System according to claim 9, wherein each of the repeater input circuits and each of the repeater output circuits is an active filter whose center frequency depends on the value of an impedance coupled respectively thereto, and wherein the means in each repeater changes the effective values of the impedances in the corresponding input and output active filters.

16. System of claim 9, wherein each of said repeaters also includes a phase-locked loop connected between the repeater output circuit and the repeater sound transmitter and including a voltage-controlled oscillator together with means for locking its frequency to that of the repeater output circuit output; the means in each repeater also acting upon the receipt of carrier frequency $f_2$ to shift the center of the phase-locked loop capture range to frequency $f_1$.

17. In a signal transmission system utilizing a continuous carrier which is periodically shifted back and forth between two frequencies $f_1$ and $f_2$: a repeater arrangement for receiving and retransmitting said carrier comprising a signal receiver, a tunable input circuit receptive of the signal receiver output, a shift frequency heterodyne oscillator connected to heterodyne with the output of said input circuit, the frequency of said oscillator being equal to the difference between $f_1$ and $f_2$, a tunable output circuit, a signal transmitter coupled to and driven from said output circuit, and means, acting in response to the receipt by said receiver of carrier frequency $f_1$, to tune said input circuit to frequency $f_1$ and to tune said output circuit to frequency $f_2$.

18. In a signal transmission system utilizing a continuous carrier which is periodically shifted back and forth between two frequencies $f_1$ and $f_2$: a repeater arrangement for receiving and retransmitting said carrier comprising a signal receiver, a tunable input circuit comprising an active filter receptive of the signal receiver output, a tunable output circuit comprising an active filter, a signal transmitter coupled to and driven from said output circuit, and means, acting in response to the receipt by said receiver of carrier frequency $f_1$, to tune said input circuit to frequency $f_1$ and to tune said output circuit to frequency $f_2$.

19. In a signal transmission system utilizing a continuous carrier which is periodically shifted back and forth between two frequencies $f_1$ and $f_2$: a repeater arrangement for receiving and retransmitting said carrier comprising a signal receiver, a tunable input circuit comprising an active filter receptive of the signal receiver output and whose center frequency depends on the value of an impedance coupled thereto, a tunable output circuit, a signal transmitter coupled to and driven from said output circuit, and means, acting in response to the receipt by said receiver of carrier frequency $f_1$, to tune said input circuit to frequency $f_1$ by changing the effective value of said impedance in said input circuit and to tune said output circuit to frequency $f_2$.

20. In a signal transmission system utilizing a continuous carrier which is periodically shifted back and forth between two frequencies $f_1$ and $f_2$: a repeater arrangement for receiving and retransmitting and carrier comprising a signal receiver, a tunable input circuit comprising an active filter whose center frequency depends upon the value of an impedance coupled thereto, said input circuit being receptive of the signal transmitter output, a tunable output carrier comprising an active filter whose center frequency depends upon the value of an impedance coupled thereto, a signal transmitter coupled to and driven from said output circuit, and means, acting in response to the receipt by said receiver of carrier frequency $f_1$, to tune said input circuit to frequency $f_1$ and to tune said output circuit to frequency $f_2$ by changing the effective values of said impedance.

21. A signal transmission system for use in a borehole, comprising, at a location A: a sound source acoustically coupled to the drill pipe in said borehole for transmitting an acoustic carrier wave along such pipe, and means supplying to said source wave energy periodically shifted back and forth between two frequencies $f_1$ and $f_2$, thereby to transmit along the drill pipe an acoustic carrier wave periodically shifted back and forth between frequencies $f_1$ and $f_2$: and at a location B spaced a pre-established distance along said drill pipe from location A: a sound pick-up acoustically coupled to the drill pipe, a tunable input circuit comprising an active filter receptive of the sound pick-up output, a tunable output circuit comprising an active filter associated with said input circuit, a sound transmitter acoustically coupled to the drill pipe and driven from the said output circuit, and means acting upon the receipt by said pick-up of carrier frequency $f_1$ to tune said input circuit to frequency $f_1$ and said output circuit to frequency $f_2$, and upon receipt of carrier frequency $f_2$ to tune said input circuit to frequency $f_2$ and said output circuit to frequency $f_1$.

22. A signal transmission system for use in a borehole, comprising, at a location A: a sound source acoustically coupled to the drill pipe in said borehole for transmitting an acousicc carrier wave along such pipe, and means supplying to said source wave energy periodically shifted back and forth between two frequencies $f_1$ and $f_2$, thereby to transmit along the drill pipe an acoustic carrier wave periodically shifted back and forth between frequencies $f_1$ and $f_2$; and at a location B spaced a pre-established distance along said drill pipe from location A: a sound pick-up acoustically coupled to the drill pipe, a tunable input circuit receptive of the sound pick-up output, a tunable output circuit associated with said input circuit, a sound transmitter acoustically coupled to the drill pipe and driven from said output circuit, means acting upon the receipt of said pick-up of carrier frequency $f_1$ to tune said input circuit to frequency $f_1$ and said output circuit to frequency $f_2$, and upon receipt of carrier frequency $f_2$ to tune said input circuit to frequency $f_2$ and said output circuit to frequency $f_1$, and a shift frequency heterodyne oscillator connected to heterodyne with the output of said input circuit to provide a sideband frequency for application to said output circuit, the frequency of said oscillator being equal to the difference between $f_1$ and $f_2$.

* * * * *